United States Patent [19]
Ikawa

[11] Patent Number: 5,155,328
[45] Date of Patent: Oct. 13, 1992

[54] DEVICE FOR DETECTING CUTTING STATES IN LASER BEAM MACHINING

[75] Inventor: Masato Ikawa, Isehara, Japan

[73] Assignee: Amada Company, Limited, Japan

[21] Appl. No.: 740,909

[22] Filed: Aug. 6, 1991

[30] Foreign Application Priority Data

Aug. 7, 1990 [JP] Japan .................. 2-207610
Aug. 28, 1990 [JP] Japan .................. 2-224317

[51] Int. Cl.$^5$ ............................................. B23K 26/02
[52] U.S. Cl. .......................... 219/121.83; 219/121.67; 219/121.7; 219/121.68
[58] Field of Search .................. 219/121.83, 121.67, 219/121.68, 121.72, 121.61, 121.62, 121.7, 121.71, 121.19, 121.69

[56] References Cited

U.S. PATENT DOCUMENTS

| | | | |
|---|---|---|---|
| 3,689,159 | 9/1972 | Taniguchi et al. | 219/121.83 |
| 3,700,850 | 10/1972 | Lumley et al. | 219/121.68 |
| 4,419,562 | 12/1983 | Joni et al. | 219/121.62 |
| 4,504,727 | 3/1985 | Melcher et al. | 219/121.62 |
| 4,818,841 | 4/1989 | Sliva et al. | 219/121.83 |
| 4,952,770 | 8/1990 | Heyashi | 219/121.67 |

FOREIGN PATENT DOCUMENTS 0344339 6/1989 Fed. Rep. of Germany.

OTHER PUBLICATIONS

European Search Report, EP 91 11 3229, dated Mar. 25, 1992 (Berlin).
Patent Abstracts of Japan, vol. 10, No. 151 (M-483) (2208), May 31, 1986.

Primary Examiner—C. L. Albritton
Attorney, Agent, or Firm—Wigman & Cohen

[57] ABSTRACT

A device for detecting the state of cutting of metal sheet in laser beam machining. The device has a sensor head for catching and guiding light induced on a metal sheet in laser beam machining to a detecting section which includes an input amplifier, pierce finish detecting sections, an improper cutting detecting section, and a NC output section. The light is converted into electric signals and sent to all the detecting sections, whereby the signals are compared with reference values, and finish of piercing and improper cutting states such as gousing and burning are detected and as a result a pierce finish signal and an improper cutting signal are sent to a NC device of laser beam machinery by means of the NC output section to control machining.

2 Claims, 4 Drawing Sheets

DEVICE FOR DETECTING CUTTING STATES IN LASER BEAM MACHINING

BACKGROUND OF THE INVENTION

1. Filed of the Invention

This invention relates to a device for detecting states of cutting of a metal sheet by laser beam machinery, in particular to a device for detecting finish of piercing, a device for detecting improper cutting, and a device for detecting finish of piercing and improper cutting.

2. Description of the Prior Art

It is desirable to detect the cutting state in cutting a metal sheet by laser beam machinery. Such cutting is carried out quickly, easily, and safely by detecting finish of piercing and improper cutting states such as grousing and burning.

Piercing must be done before starting cutting of a metal sheet by laser beam machinery. The finishing time of piercing is a period form opening of a shutter of the laser beam machinery for applying laser beam onto a metal sheet to penetrating of the metal sheet by the laser beam. The finishing time depends on states of a generator such as the power and mode, of a work such as thickness, composition, and surface condition, and of the machinery such as a mirror and a cutting lens. For example, in the case of a standard steel plate, the finishing time is 5 seconds when such elements are in the best condition and 12.5 seconds when worst, resulting in the difference of 7.5 seconds.

In the conventional laser beam machining, a sufficient time is given for the laser beam machinery to afford the finish of piercing because piercing may carried out under the worst condition. Therefore, the machinery is usually waiting until the given time is over after piercing has already completed. Furthermore, there is no device to detect the finish of piercing. Hence, the machinery must wait for a certain time causing a lot of time loss.

In addition, an automatic programming device or operator must know the information about the finishing time of piercing for every workpiece since the finishing time is different depending on material and thickness of the workpiece. Furthermore, the information about the finishing time is necessary for NC library or statement. Therefore, memory is used, and machining speed is delayed.

In cutting of a metal sheet by laser beam machinery, the metal sheet is cut properly when laser beam machinery is in the proper state and when cutting of a metal sheet is carried out under good condition by the laser beam machinery. However, if the state of the machinery, for example, the state of a generator, mirror, lens and/or assist gas of the machinery is improper, or if cutting is done under severe condition, the cut of metal sheet would be improper, resulting in gousing in which the metal sheet is not cut properly, or in burning in which the metal sheet is cut, however, causing a large amount of dross.

As grousing causes spatter which is scattered in a broad area and which may cause a fire, and as burning causes defects in the product, a worker must always stay near the laser beam machinery and watch the cutting state carefully.

SUMMARY OF THE INVENTION

The present invention is made to overcome the above mentioned problems. The first object of the invention is to provide a device for detecting the finish of piercing independently from material and thickness of the metal sheet.

The second object of the invention is to provide a device for detecting improper cutting such as gousing and burning.

The third object of the invention is to provide a device provided with both the above pierce finish detecting device and improper cutting detecting device for detecting cutting states such as pierce finish and improper cutting.

The pierce finish detecting device of the present invention consists of a sensor head for catching light induced on a metal sheet surface when the metal sheet is subject to a laser beam from laser beam machinery and converting the light caught into electric signals, and a detecting section for detecting the finish of piercing based on the signals.

the sensor head including a device for guiding the light induced on metal sheet surface to a predetermined direction, and a photo-sensor for processing and converting the light into the electric signals.

the detecting section including an amplifier for amplifying the electric signals and outputting the amplified signals, a first or level detecting section for detecting level of the amplified signals and outputting a pierce finish signal, a second or vibration detecting section for detecting vibration of the amplified signals and outputting a pierce finish signal, and a NC output section for receiving the pierce finish signal from the first and second detecting sections and sending the pierce finish signal to a NC device of laser beam machinery.

The sensor head catches the light induced on the metal sheet surface between a distal end of a cutting head nozzle and a cutting lens of the laser beam machinery.

The device for guiding the light induced on metal sheet surface to the predetermined direction may be, for example, a mirror or optical fiber which reflects or guides the light to the direction.

Owing to the fact that the pierce finish detecting device is designed as mentioned above, the light induced on the metal sheet surface by emission of a laser beam from laser beam machinery is caught by the sensor head and guided to the first and second detection sections for determining the pierce finish. The strength of the light induced on the metal sheet changes during the laser beam machining. In other words, the light is strong for the first time, and however weakens suddenly when the laser beam penetrates a metal sheet, that is, the pierce is completed. This phenomenon enables the detecting sections to detect the change of the light and determine the finish of the pierce. The detecting sections send a pierce finish signal to the NC device when the pierce is finished. The pierce finish is determined by detecting the level and vibration of the amplified signal waves since the signal waves present various wave forms.

The improper cutting detecting device of the present invention includes a sensor head for catching light induced on a metal sheet surfaced when the metal sheet is subject to a laser beam from laser beam machinery and converting the light caught into electric signals, and a detecting section for processing the electric signals and detecting the improper cutting by comparing the processed signals with a predetermined reference voltage value. Here, the improper cutting means a cut causing grousing and/or burning.

When an improper cutting such as grousing or burning is caused in cutting of a metal sheet by laser beam machinery, the light induced on the metal sheet is stronger than usual. The light is detected by the sensor head and sent to the improper cutting detecting section. The signal from the sensor head is processed appropriately and compared with a predetermined reference voltage value. If the processed signal is lower than the reference voltage value, the cutting is determined as normal or proper cutting. On the contrary, if the processed signal is higher than the reference voltage value, the cutting is determined as improper cutting in which gousing or burning is caused. In the latter case, the improper cutting detecting section sends a signal of improper cutting to a NC device of the laser beam machinery and disactivate the NC device and give a warning of danger.

The cutting state detection device of the present invention includes the pierce finish detecting device and the improper cutting detecting device for detecting finish of piercing and improper cutting.

DESCRIPTION OF THE PREFERRED EMBODIMENTS

Now, the embodiments of the present invention are described in detail with reference to the accompanying drawings.

Figure 1:
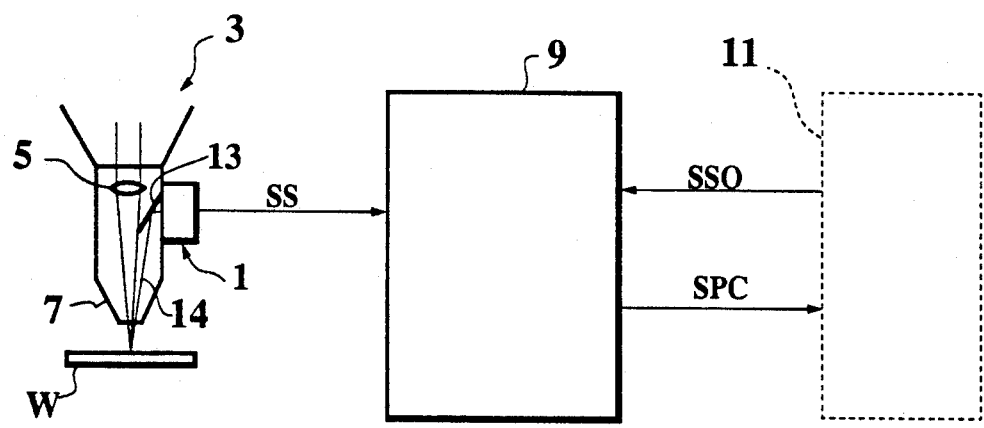
FIG. 1 is a diagram showing the basic constitution of a pierce finish detection device of the present invention.

In FIGS. 1 to 5, the pierce finish detecting device is described first. In FIG. 1, the basic constitution of the pierce finish detecting device is shown. The pierce finish detecting device consists of a sensor head 1 and a detecting section 9. The sensor head 1 is attached to a cutting head 3 of laser beam machinery. The sensor head 1 catches light 14 induced on a metal sheet W during piercing between a cutting lens 5 and a nozzle 7 of the laser beam machinery and converts the light 14 to electric signals SS. The signal SS detected by the sensor head 1 is sent to the detecting section 9, and in this detecting section 9 finish of piercing is detected and a pierce finish signal SPC is sent to a NC device 11 of the laser beam machinery. The NC device sends a shutter opening signal SSO to the detecting section 9 to open a shutter of the laser beam machinery just before piercing starts.

Figure 2A:
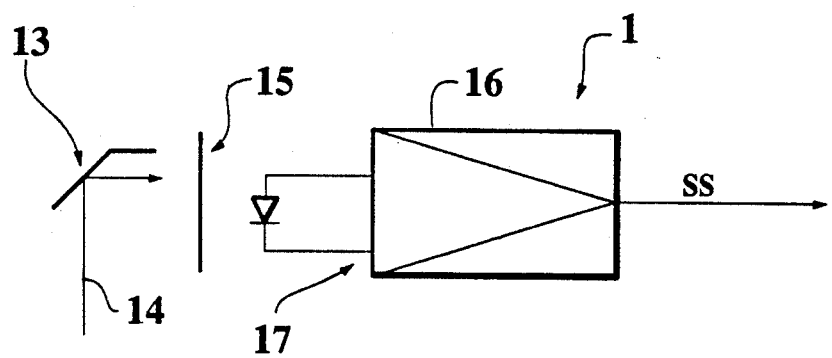
FIG. 2A is a diagram showing a sensor head of the pierce finish detecting device shown in FIG. 1.

In FIG. 2A, a sensor head 1 mainly consists of a mirror 13, a window 15, and a visible radiation sensor 17 with an amplifier 16. The mirror 13 is disposed in the cutting head 3. However, the visible radiation sensor 17 is partitioned by the window 15 and detached from the cutting head 3 since the inside of the cutting head 3 is full of an assist gas such as oxygen, etc. and is under severe condition because the inside is a passage of the laser beam. The light 14 caught is converted and amplified into the electric signals SS by the visible radiation sensor 17 and sent to the detecting section 9 shown in FIG. 2B. The mirror 13, window 15, and visible radiation sensor 17 are formed integrally.

Figure 2B:
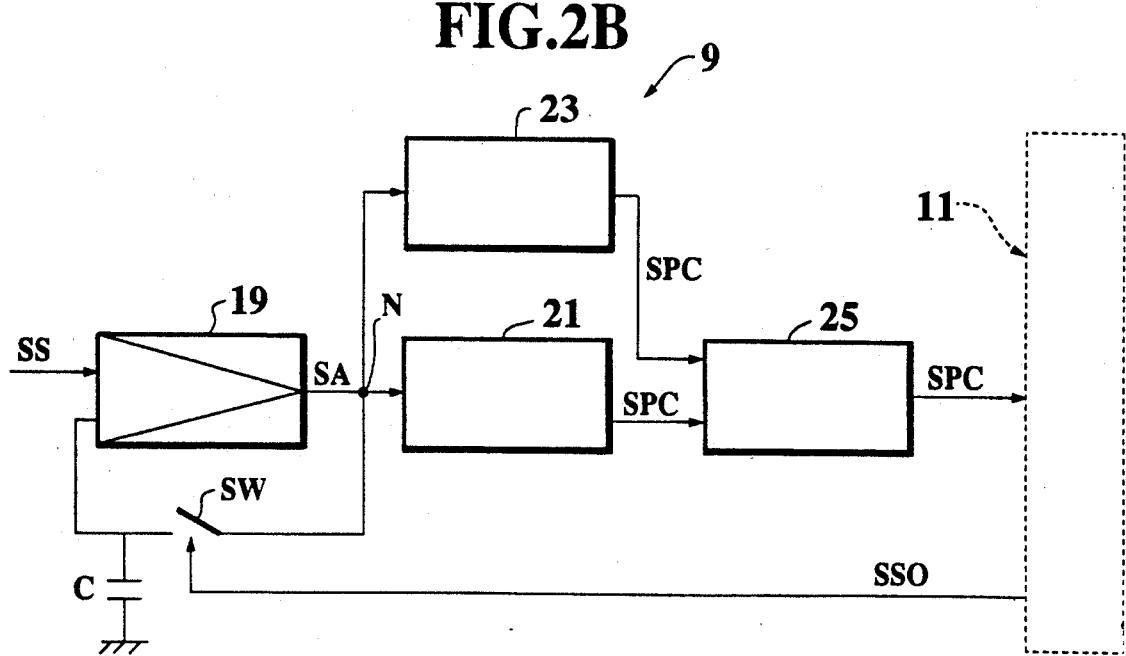
FIG. 2B is a diagram showing a detecting section of the pierce finish detecting device.

In FIG. 2B, the detecting section 9 mainly consists of an input amplifier 19, a first detecting section 21 for detecting level of input signals SA from the amplifier 19, a second detecting section 23 for detecting vibration or vibration wave form of the input signals SA from the amplifier 19, and a NC output section 25.

The input amplifier 19 includes an offset switch SW and a capacitor C. The offset switch SW is connected or switched ON to condense electric charge in the capacitor C equally to input voltage when a shutter of the laser beam machinery is closed, that is, there is no signal from the sensor head 1. Therefore, output voltage is always kept in zero at the point N.

When piercing is started the shutter opening signal SSO is given to the input amplifier 19 to make the offset switch SW disconnected or OFF and as a result the offset adjustment is released.

Since the output voltage from the input amplifier 19 is adjusted to be zero when the sensor signal SS is input into the amplifer 19 just before the opening of the shutter, changes only in the signals SS after the opening of the shutter will be amplified and outputted as signals SA.

The outputted signals SA is sent to or inputted in the first and second detecting sections 21 and 23. The first detecting section 21 watches the state of the signals SA and compares the mean level of the wave form W of the signals SA with two reference values VH and VL.

Figure 3:
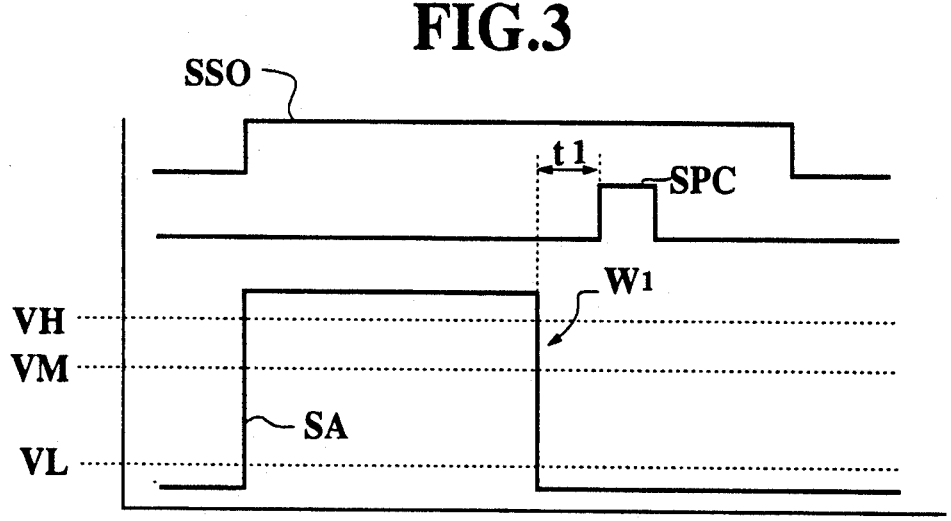
FIGS. 3 to 5 are charts showing respective wave forms W1, W2 and W3 of signals from the sensor head for explaining how to determine the finish of piercing.
Figure 4:
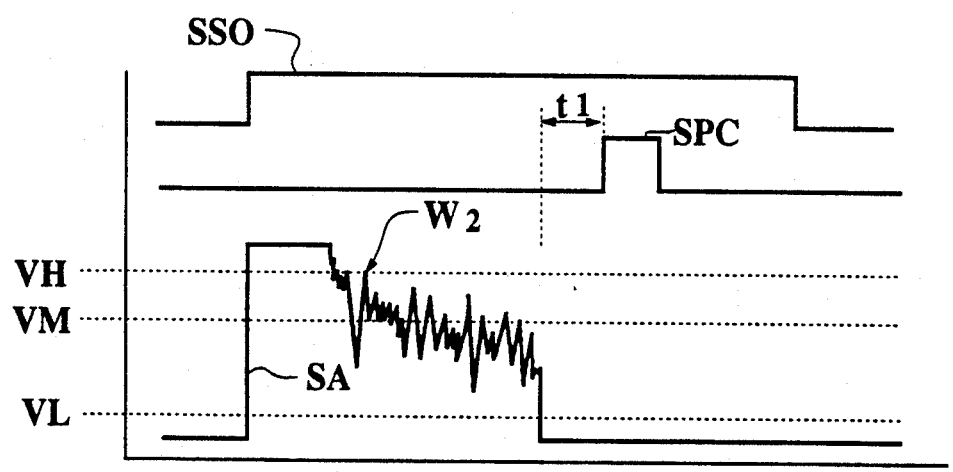

In FIGS. 3 and 4, how to determine the finish of piercing is described in the case of wave forms W1 and W2 of the input signals SA. The first detecting section 21 for detecting the signal levels operates upon receiving a shutter opening signal SSO, and confirms that the input signal SA became higher than a reference value VH. When the piercing is continued, the input signal SA drops suddenly like the wave form W1 shown in FIG. 3, or gradually like the wave form W2 shown in FIG. 4. The first detecting section 21 detemines that the pierce is completed if the state in which the input signal SA is under the reference value VL continues for a predetermined time, and send a pierce finish signal SPC to the NC output section 25.

Figure 5:
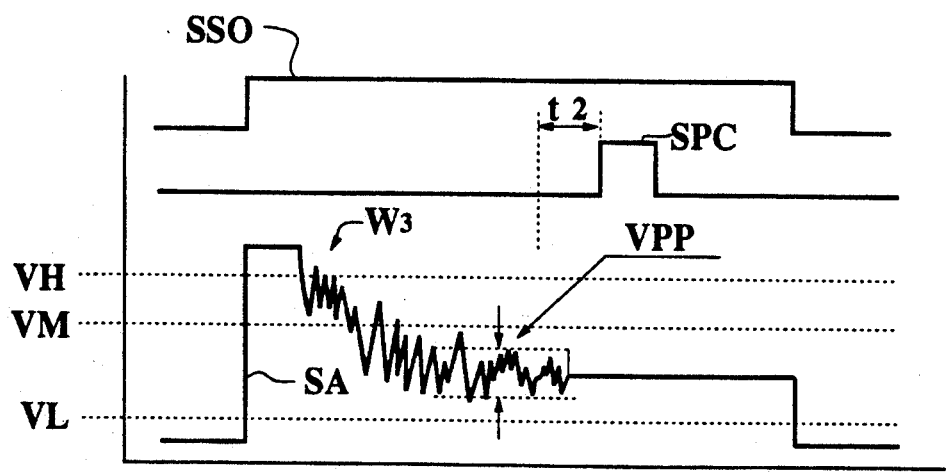

In FIG. 5, how to determine the finish of piercing is described in the case of wave form W3 of the input signals SA. The second detecting section 23 for detecting the signal vibration operates upon receiving a shutter opening signal SSO, and confirms that the input signals SA became higher than the reference value VH. When the piercing is continued, the input signal SA gradually drops while vibrating, and then the vibration ceases. When the state of no vibration continues for a time t2 and the mean value of the input signals SA is lower than a reference value VM, the second detecting section 23 give the NC output section 25 a pierce finish signal SPC. For the state of no vibration, here, it is determined as the state of no vibration if the difference between the maximum and minimum values of the wave form W3 of the input signals SA is lower than a predetermined value VPP.

If one of the first and second detecting sections 21, 23 satisfies the above mentioned condition, a pierce finish signal SPC is sent to the NC output section 25 and from which the pierce finish signal SPC is sent to the NC device 11 of the laser beam machinery. Hence, the NC device 11 stops waiting for finish of piercing and starts cutting.

In the above embodiment, the light 14 induced on the metal sheet W is reflected by the mirror 13 disposed in the cutting head 3 and guided to the photo-sensor 17 (visible radiation sensor) outside the cutting head 3 through the window 15 on a wall of the cutting head 3. However, the photo-sensor may be disposed in the cutting head 3 so that the light 14 can be directly detected. In addition, optical fiber may be used instead of the mirror 13 and the window 15 and as a result the light 14 is guided outside directly. Furthermore, the place to catch the light may be above the cutting lens 5. Furthermore, other sensors such as an ultraviolet or infrared ray sensor, a heat sesor etc. may be used to detect the changes of the light.

Figure 6:
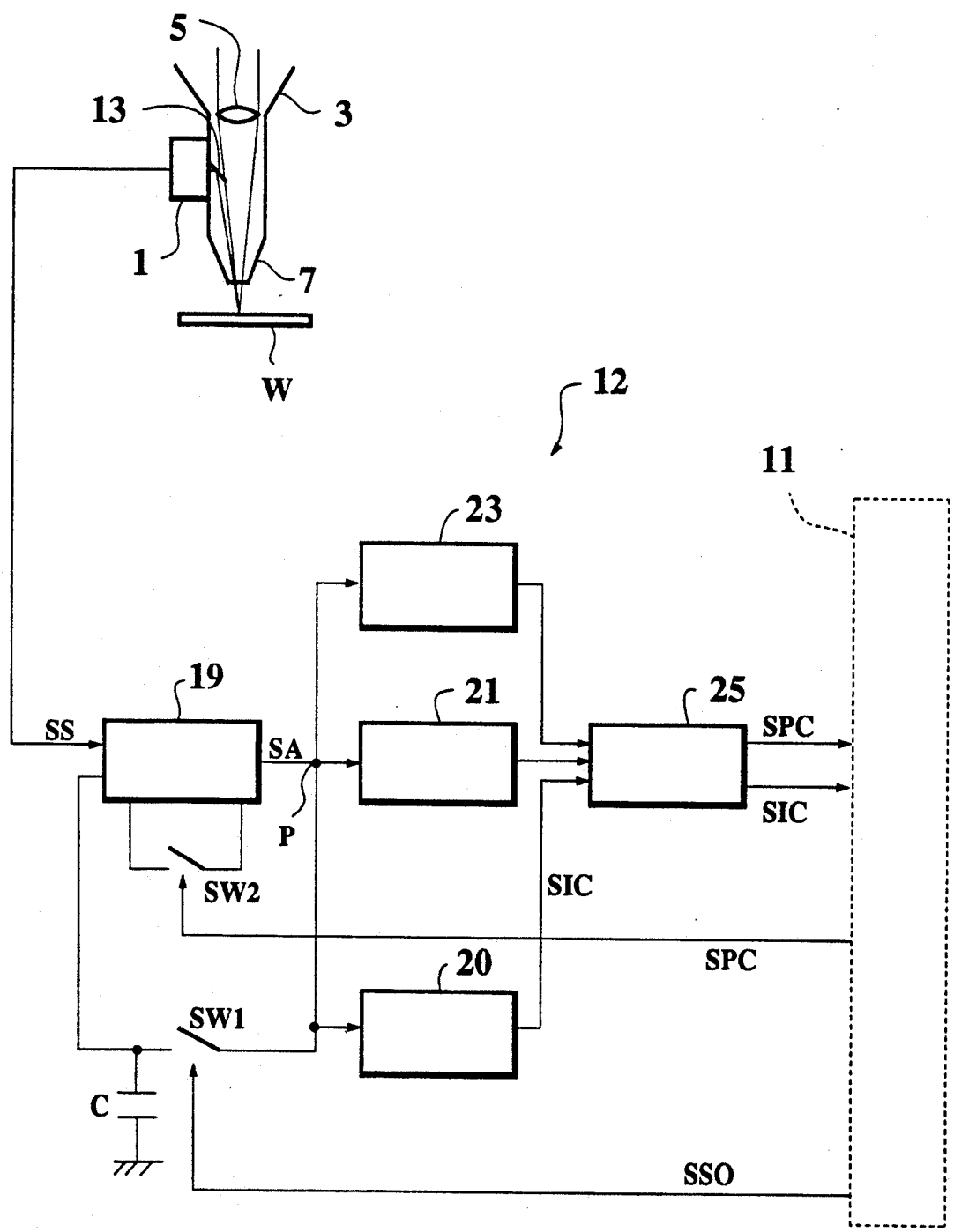
FIG. 6 is a diagram showing an improper cutting detection device and a cutting state detecting device of the present invention.
Figure 7:
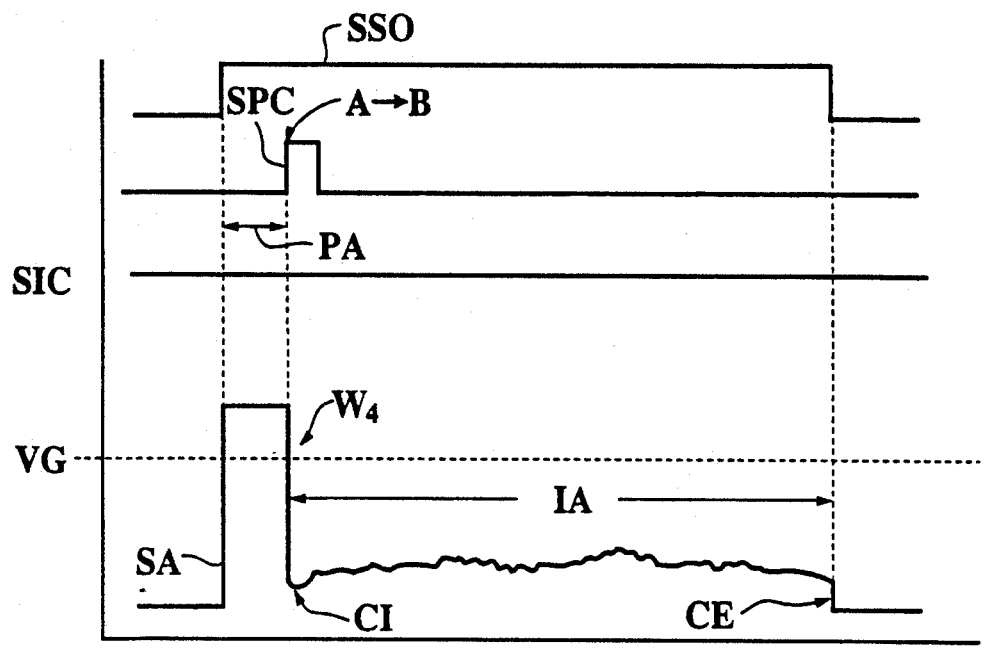
FIG. 7 is a wave form chart of signals detected by the improper cutting detection device shown in FIG. 6 where a cutting state is proper or normal.
Figure 8:
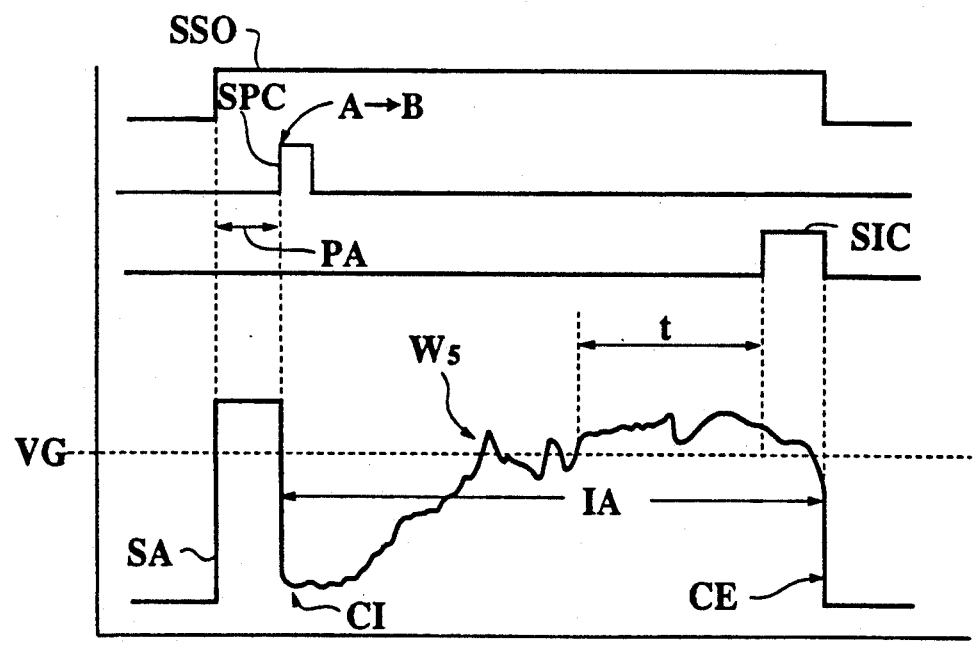
FIG. 8 is a wave form chart of signals detected by the improper cutting detection device shown in FIG. 6 where a cutting state is improper.

In FIGS. 6 to 8, an improper cutting detecting device and a cutting state detecting device are described.

In FIG. 6, the cutting state detecting device of the present invention is shown. The cutting state detecting device includes the improper cutting detecting device of the present invention. The cutting state detecting device is similar to the pierce finish detecting device of the above described and shown in FIGS. 1 and 2. The different point is that an improper cutting detecting section 17 and a gain switch SW2 to help the detection of improper cutting are added to the pierce finish detecting device. Accordingly, the same reference numerals or letters are used for elements of this cutting state detecting device as the pierce finish detecting device.

The cutting state detecting device and improper cutting detecting device consists of a sensor head 1 and a detecting section 12, and output of the detecting section 12 will be sent to a NC device of laser beam machinery.

The sensor head 1 is roughly the same as a sensor head shown in FIGS. 1 and 2. The sensor head 1 catches light induced on a metal sheet W and amplifies and converts it into electric signals SS and sends the signals SS to the detecting section 12 during piercing and cutting of the meal sheet W by the laser beam machinery.

The detecting section 12 includes an input amplifier 19 and a third detecting section 20 for detecting an improper cutting, as well as the first and second detecting sections 21 and 23 and the NC output device 25 of the above.

The input amplifier 19 amplifies the input signals SS and has an offset switch SW1 and a gain switch SW2. While a shutter of the laser beam machinery is closed, the offset switch SW1 is closed and therefore output of the amplifier 19 is kept in zero. The gain switch SW2 is opened when piercing is completed to lower the gain of the amplifier 19 from A to B to detect improper cutting easily. The operations of these switches SW1, SW2 are controlled by the NC device. The third detecting section 20 determines whether cutting is proper or improper by judging the signals SA from the input amplifier 19.

In FIG. 7, shown is a wave form W4 of the signals SA of a proper cutting state. The offset of the amplifier 19 is released when receiving a shutter opening signal SSO and consequently the ampler 19 amplifies the signals SS under the gain A. When piercing is initiated, the pierce detecting sections 21 and 23 begin to operate as shown by PA in FIG. 7, and the amplified input signals SA rising and exceeding a reference voltage VG are detected by the third detection section 20. When piercing is completed, the input signals SA suddenly drop. The signal drop means that the pierce is formed. Then, one of the pierce detecting sections 21, 23 sends a pierce finish signal SPC to the NC device 11.

The NC device 11 sends the pierce finish signal SPC to the input amplifier 19 to lower the gain from A to B and then initiates cutting operation. At the same time, the third detecting section 20 begin to operate. In FIG. 7, CI and CE respectively stand for the beginning and end of cutting, and the third detecting section 20 operates for the time between CI and CE. If the input signals SA amplified under the gain B does not exceed the reference voltage value VG as shown in FIG. 7, the cutting is determined as proper cutting, and an improper cutting signal or pulse SIC is not outputted as shown in the drawing.

In FIG. 8, a wave form W5 of the signals SA of an improper cutting state is shown. If the signals SA amplified under the gain B exceed the reference voltage value VG for a predetermined time t, it is determined as improper cutting where gousing and/or burning is caused, and than an improper cutting signal SIC is sent to the NC output section 25.

The NC output section 25 sends the improper cutting signal SIC to the NC device 11, and then the NC device 11 closes the shutter to stop the machining and gives a warning. The NC device 11 may adjust the laser beam output and/or machining speed to continue the machining instead of stopping it.

I claim:

1. A device for detecting finish of piercing in cutting of a metal sheet by laser beam machinery, comprising:
   a sensor head for detecting and converting light induced on a surface of a metal sheet in laser beam machining into electrical signals and outputting said signal; and a detecting section for detecting finish of piercing based on said signals,
   wherein said sensor head includes a device for guiding said light to a direction and a photo-sensor for converting said guided light into said signals and sending said signals to said detecting section, and
   wherein said detecting section includes an input amplifier for amplifying said signals and outputting said amplified signals, a first detecting section for receiving said amplified signals and detecting level of said amplified signals and sending a pierce finish signal, a second detecting section for receiving said amplified signals and detecting vibration of said amplified signals and sending a pierce finish signal, and a NC output section for receiving said pierce finish signal from said first and second detection sections and sending said pierce finish signal to a NC device of said laser beam machinery.

2. The device of claim 1, wherein said sensor head catches and reflects said light induced on said metal between a cutting head and a nozzle of said laser beam machinery to said direction by a mirror.

3. The device of claim 2, wherein said photo-sensor is disposed outside said cutting head.

4. The device of claim 1, wherein said first detecting section detects a state in which level of said amplified signals is under a reference value continuously for a time and as a result sends said pierce finish signal, said second detecting section detects a state in which amplitude of a vibration wave form of said amplified signals is under a reference value continuously for a time and as a result sends said pierce finish signal, and said NC output section sends said pierce finish signal to said NC device of said laser beam machinery when receiving said pierce finish signal from either one of said first and second detecting sections.

5. A device for detecting improper cutting in cutting of a metal sheet by laser beam machinery, including:
   a sensor head for detecting and converting light induced on a surface of a metal sheet in laser beam machining into electrical signals and outputting said signals,
   a detecting section for detecting improper cutting by comparing signals processed from said signals outputted from said sensor head with a reference voltage value and sending an improper cutting signal, and
   a NC output section for receiving said improper cutting signal from said detecting section and sending said improper cutting signal to a NC device of said laser beam machinery.

6. The device of claim 5, wherein said detecting section determines that said improper cutting is caused when detecting a state in which said processed signals exceed said reference voltage value continuously for a time.

7. A device for detecting improper cutting states in cutting of a metal sheet by laser beam machinery, comprising of:
   a sensor head for detecting and converting light induced on a surface of a metal sheet in laser beam machining into electrical signals and outputting said signals; and
   a detecting means for detecting finish of piercing based on said signals and for detecting improper cutting signals,
   wherein said sensor head includes a device for guiding said light to a direction and a photo-sensor for converting said guiding light into said signals and sending said signals to said detecting means, and
   wherein said detecting means includes an input amplifier for amplifying said signals and outputting said amplified signals, a first detecting section for receiving said amplified signals and detecting level of said amplified signals and sending a first pierce finish signal, a second detecting section for receiving said amplified signals and detecting vibration of said amplified signals and sending a second finish signal, a third detecting section for detecting improper cutting by comparing signals outputted from said sensor head with a reference voltage value and sending an improper cutting signal, and an NC output section for receiving said first and second pierce finish signals from said first and second detecting sections and for receiving said improper cutting signal from said third detecting section and sending said first and second pierce finish signals to a NC device of said laser beam machinery.

* * * * *